United States Patent [19]

DePauw et al.

[11] 4,244,380
[45] Jan. 13, 1981

[54] ADJUSTABLE TRANSPORT VANES FOR AXIAL FLOW COMBINE

[75] Inventors: Richard A. DePauw, East Moline; Neil C. Dunn; James R. Lucas, both of Moline, all of Ill.

[73] Assignee: International Harvester Company, Chicago, Ill.

[21] Appl. No.: 22,238

[22] Filed: Mar. 20, 1979

[51] Int. Cl.³ .............................................. A01F 7/06
[52] U.S. Cl. ................................... 130/27 T; 56/14.6
[58] Field of Search ............ 56/14.6; 130/27 T, 27 R, 130/27 HA, 27 H, 27 J, 27 L, 27 N

[56] References Cited

U.S. PATENT DOCUMENTS

| | | | |
|---|---|---|---|
| 3,529,645 | 9/1970 | Murray et al. | 130/27 T |
| 3,817,256 | 6/1974 | Buchele et al. | 130/27 H |
| 3,943,939 | 3/1976 | Hill | 56/14.6 |

*Primary Examiner*—Robert A. Hafer
*Attorney, Agent, or Firm*—Neal C. Johnson; F. David AuBuchon

[57] ABSTRACT

An axial flow combine having a crop harvesting header including a feeder for cutting a crop and feeding it rearwardly into a threshing and separating mechanism. The mechanism includes a casing for receiving the crop material and a rotor within the casing for threshing and separating grain from the crop material. A plurality of crop material directing vanes is disposed within the casing and cooperate with the rotor in directing the material generally helically along the casing. Means are included for selectively and simultaneously adjusting the position of the vanes to change the rate of movement of the crop material through the casing.

7 Claims, 3 Drawing Figures

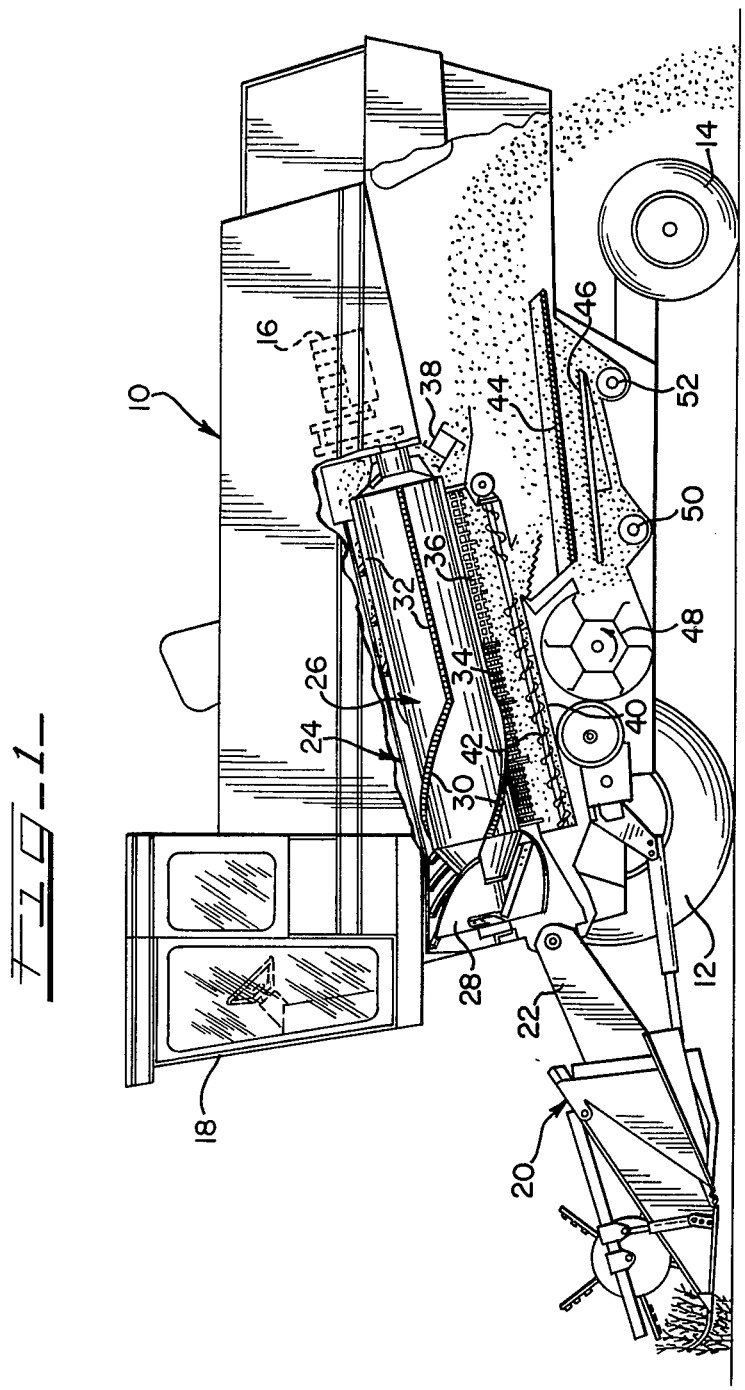

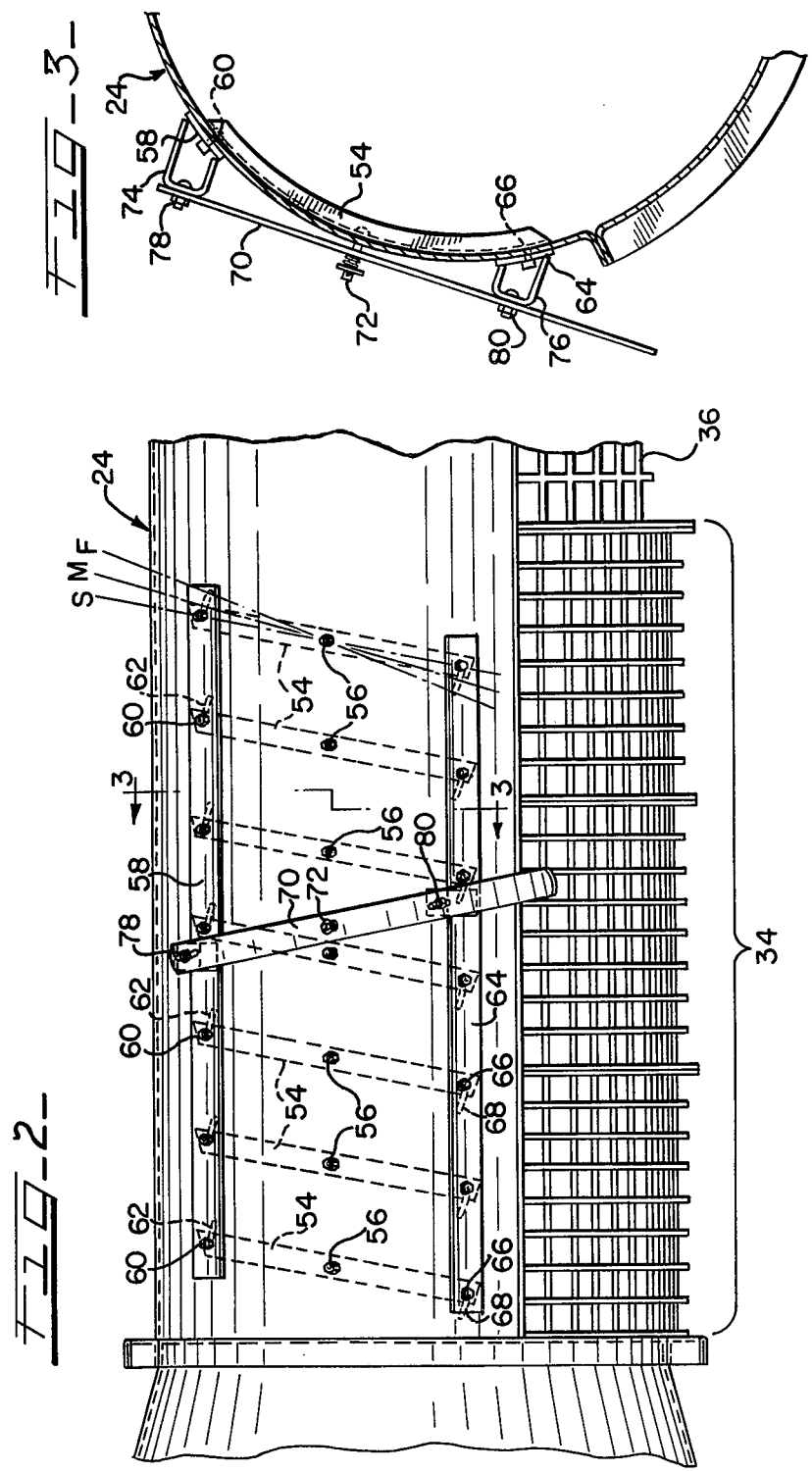

ADJUSTABLE TRANSPORT VANES FOR AXIAL FLOW COMBINE

BACKGROUND OF THE INVENTION

1. Field of the Invention

The invention relates generally to axial flow combines and more particularly to an improved crop flow control through the threshing mechanism of the combine.

2. Prior Art:

It is known to mount a plurality of vanes on the inner surface of a rotor casing to assist in directing the movement of the crop material through the threshing mechanism of a combine. It is further known that such vanes can be releasably secured in several positions depending upon crop type or conditions. That is, the vanes may be bolted on the casing at several different angles relative to the axis of the mechanism. It is further known to adjustably mount a vane on the rotor of an axial flow combine (U.S. Pat. No. 3,645,270) but not showing the means for adjustable mounting.

Since the threshing and separating mechanism of an axial flow combine may include a multitude of transport vanes, it is unduly time-consuming to reposition each vane individually as in the prior art. It is of course necessary to shut down the machine when working adjacent to the threshing and separating mechanism. Consequently, no crop harvesting can be accomplished during the period of adjustment.

SUMMARY

The invention provides an improved crop flow adjustment through the threshing mechanism of an axial flow combine. A plurality of crop transport vanes is mounted along the threshing zone and cooperate with the rotor of the mechanism to direct the crop material generally helically along the zone. The invention includes means for simultaneously adjusting the vanes to conveniently control the rate of movement of the material through the mechanism.

It is a primary object of the invention to significantly reduce the time required to adjust the position of crop material transport vanes within the threshing mechanism of an axial flow combine.

Another object in conjunction with the foregoing object is to adjust a plurality of transport vanes simultaneously.

A general object is to maximize harvesting time and efficiency by enabling the operator to select the optimum position of the transport vanes in a minimum of time.

BRIEF DESCRIPTION OF THE DRAWINGS

FIG. 1 is a side elevation partly broken away showing an axial flow combine;

FIG. 2 is an enlarged fragmentary view of the threshing zone of the axial flow combine of FIG. 1; and FIG. 3 is a fragmentary sectional view taken in the direction of arrows 3—3 of FIG. 2.

DESCRIPTION OF THE PREFERRED EMBODIMENT

Referring first to FIG. 1 there is shown a self-propelled combine of the type marketed currently by the assignee herein under model designations 1440 and 1460 for example. The combine includes a body 10 supported on front drive wheels 12 and rear steerable wheels 14. An engine 16 powers the combine which is controlled by the operator from within a control center 18. The combine is provided with a header 20 for cutting the standing crop and conveying the cut crop to a feeder 22. The feeder 22 conveys the crop rearwardly into an axial threshing and separating unit including a generally cylindrical casing 24 and a generally cylindrical rotor 26 mounted therein. The rotor 26 is driven from the engine 16 and includes a front mounted impeller 28 which imparts rearward movement to the crop material received from the feeder 22. High speed rotation of the rotor 26 impels the material rearwardly in a generally helical direction about the rotor.

A plurality of rasp bars 30 and separator bars 32 mounted on the cylindrical surface of the rotor 26 cooperate respectively with a semi-cylindrical concave 34 and a semi-cylindrical grate 36 forming the bottom of the casing 24 to thresh the crop material such that most of the grain will be separated and impelled downwardly through the concave and grate. In practice the concave 34 consists of several removable sections extending approximately one half the axial length of the casing 24. Likewise, the grate 36 consists of several removable sections extending the remaining half of the casing length. The concave 34 and grate 36 thus define respective threshing and separating zones.

The straw and other waste material is impelled rearwardly out of the casing 24 where a rotary beater 38 throws the straw rearwardly from the machine as shown. Most of the grain drops onto an auger bed 40 where it is conveyed rearwardly by a plurality of augers 42 for subsequent cleaning and collection.

The combine includes a system for cleaning chaff and foreign matter, or tailings, from the grain. This system includes a chaffer sieve 44, a grain sieve 46, a cleaning fan 48, a clean grain auger 50, and a tailings auger 52. The chaffer sieve is mounted for fore-and-aft oscillation so that grain and tailings received from the augers 42 and grate 36 will be sifted and passed to the grain sieve 46. The sieve 46 is also mounted for oscillation to separate the grain from the tailings so that the grain passes through the sieve and onto the clean grain auger 50 while the tailings are moved rearwardly onto the tailings auger 52. The cleaning fan 48 creates an air flow upwardly and rearwardly through both seives to carry away the chaff. The clean grain collected by the auger 50 is delivered to a grain tank within the machine, while the tailings collected by the auger 52 are conveyed to the casing 24 for rethreshing.

In accordance with the invention and with reference to FIGS. 2 and 3, a plurality of vanes 54 is disposed in successively spaced apart and parallel relation along the interior of the casing 24 throughout the length of the concave 34. (Seven such vanes being utilized in the preferred embodiment). Each vane 54 is of L-section and is a segment of a circle having a diameter conforming to the interior surface of the casing 24 when the vanes are oriented parallel to the dotted line denoted M in FIG. 2. Each vane 54 is pivotally mounted on the casing 24 by a nut and bolt unit 56 which defines a pivot axis disposed radially relative to the casing 24.

A first tie bar 58 extends longitudinally of the casing 24 on the exterior thereof and is pivotally secured to the upper end of each vane 54 by nut and bolt units 60 which extend through respective slots 62 defined through the casing. Similarly, a second tie bar 64 is mounted on the exterior of the casing 24 parallel to the first tie bar 58. The tie bar 64 is pivotally secured to the lower ends of each vane 54 by nut and bolt units 66 which extend through respective slots 68 defined through the casing 24. It will be noted that the slots 62 and 68 associated with each vane 54 are defined arcuately about the respective nut and bolt unit 56 defining the pivot axis of the respective vane. In practice the bolts of the units 60 and 66 are welded to the vanes 54 and project outwardly through the respective sets of slots 62 and 68.

A lever 70 is pivotally mounted on the casing 24 by a nut and bolt unit 72 approximately midway between the tie bars 58 and 64. As shown in FIG. 3 a U-shaped strap 74 is welded onto the tie bar 58 approximately at the midpoint thereof. Similarly, a U-shaped strap 76 is welded onto the tie bar 64. The lever 70 is pivotally connected to the straps 74 and 76 by respective bolt and slot connections 78 and 80.

In operation the nut and bolt units 56, 60, and 66 are tightly secured to retain the vanes 54 against pivotal movement. As the rotor 26 moves crop material into the casing 24 the vanes 54 assist in directing the material in a generally helical path through the casing. This directs the material in repeated passes across the concave 34 for thorough threshing action. As crop types and conditions may require, the orientation of the vanes 54 may be selectively varied to vary the flow rate of material through the casing. After loosening the nut and bolt units 56, 60, and 66, the lever 70 may be pivoted about the nut and bolt unit 72 to shift the tie bars 58 and 64 in opposite directions to pivot the vanes 54 simultaneously. The vanes 54 are pivotable from the position denoted S in FIG. 2, providing the slowest rate of crop movement, to the position denoted F wherein the vanes direct crop movement in the fastest rate.

The position denoted M is a medium or intermediate position wherein the degree of curvature of each vane corresponds closely to that of the casing 24. Because this relationship changes as the vanes are pivoted toward the S or F positions, it is necessary to tighten the nut and bolt units at the selected vane position to draw the vanes into a configuration corresponding to the casing. In addition, the forces of the crop material on the vanes will not cause inadvertent pivoting of the vanes when tightly secured.

By the foregoing Applicants have provided an improved system for the control of the rate of crop movement through the threshing zone of an axial flow combine.

What is claimed is:

1. In an axial flow combine, the combination comprising:

a generally cylindrical rotor casing having an open end for reception of crop material to be threshed and separated;

a generally cylindrical rotor journalled for rotation within said casing and having a plurality of rasp bars secured thereon for threshing crop material;

a plurality of crop transport vanes disposed within said casing in radially spaced relation to the rasp bars on said rotor for coacting with said bars upon rotation of said rotor to direct the crop material generally helically along said casing;

and means for simultaneously adjusting the positions of said vanes relative to the casing to selectively vary the rate of movement of the crop material through said casing.

2. The subject matter of claim 1, including a semi cylindrical concave disposed to define a lower portion of said casing and through which the grain exits from said casing in response to crop threshing action of said rasp bars, said transport vanes being spaced successively along said casing above said concave so as to direct the flow of crop material helically between said rotor and said concave to enhance threshing efficiency.

3. The subject matter of claim 1, wherein said vanes are disposed in successively spaced apart relation along said casing, said means for adjusting including means mounting said vanes for pivoting movement about respective axes disposed radially of said casing and further including a tie bar interconnecting said vanes for conjoint pivoting movement.

4. The subject matter of claim 3, including means mounting said tie bar outside of said casing so as to be disposed out of interference with the flow of crop material.

5. The subject matter of claim 4, wherein said tie bar is connected to each of said vanes by means including a bolt directly connected between the tie bar and the vane and extending through respective slots defined through the casing to enable pivoting of said vanes in response to shifting of said tie bar.

6. The subject matter of claim 3, including a lever connected to said tie bar providing manual adjustment of said vanes.

7. The subject matter of claim 1, wherein said vanes are disposed in successively spaced apart relation along said casing, means mounting said vanes for pivoting movement about respective axes disposed radially of said casing, said axes being disposed intermediate the ends of the respective vanes, a first tie bar shiftably disposed on the outside of said casing and connected to said vanes for pivoting said vanes as the tie bar is shifted, a second tie bar shiftably disposed on the outside of said casing and connected to said vanes for pivoting said vanes as said second tie bar is shifted in opposite directions to said first tie bar, and a lever pivotally mounted on said casing and connected to said tie bars for shifting said tie bars oppositely relative to each other to conjointly pivot said vanes.

* * * * *